(12) United States Patent
Huang et al.

(10) Patent No.: US 12,123,097 B2
(45) Date of Patent: Oct. 22, 2024

(54) SELF-HEALING COATING COMPOSITIONS

(71) Applicant: Northwestern University, Evanston, IL (US)

(72) Inventors: Jiaxing Huang, Wilmette, IL (US); Chenlong Cui, Guangdong (CN); Alane Tarianna O. Lim, McLean, VA (US)

(73) Assignee: Northwestern University, Evanston, IL (US)

( * ) Notice: Subject to any disclaimer, the term of this patent is extended or adjusted under 35 U.S.C. 154(b) by 561 days.

(21) Appl. No.: 17/419,522

(22) PCT Filed: Jan. 3, 2020

(86) PCT No.: PCT/US2020/012121
§ 371 (c)(1),
(2) Date: Jun. 29, 2021

(87) PCT Pub. No.: WO2020/197609
PCT Pub. Date: Oct. 1, 2020

(65) Prior Publication Data
US 2022/0081777 A1 Mar. 17, 2022

Related U.S. Application Data

(60) Provisional application No. 62/788,160, filed on Jan. 4, 2019.

(51) Int. Cl.
*C23C 26/00* (2006.01)
*C01B 32/184* (2017.01)

(52) U.S. Cl.
CPC ............ *C23C 26/00* (2013.01); *C01B 32/184* (2017.08); *C01P 2004/30* (2013.01)

(58) Field of Classification Search
CPC ... C08K 7/22; C08K 7/24; C08K 7/26; C08K 7/28; C01P 2004/34; C23C 26/00
See application file for complete search history.

(56) References Cited

U.S. PATENT DOCUMENTS 4,757,100 A * 7/1988 Wichelhaus ........... H01B 7/285
523/218
7,723,405 B2 5/2010 Braun et al.
(Continued)

FOREIGN PATENT DOCUMENTS

DE 3150909 A * 7/1983 ........... G02B 6/4494
KR 10-2014-0118064 10/2014

OTHER PUBLICATIONS

Jeng, Tribological Properties of Carbon Nanocapsule Particles as Lubricant Additive, Oct. 2014, Journal of Tribology, vol. 136, pp. 041801-1 to 041801-9. (Year: 2014).*
Wu, Synthesis of hollow fullerene-like molybdenum disulfide/ reduced graphene oxide nanocomposites with excellent lubricating properties, 2018, Carbon 134, pp. 423-430. (Year: 2018).*
(Continued)

*Primary Examiner* — Monique R Jackson
(74) *Attorney, Agent, or Firm* — Bell & Manning, LLC

(57) ABSTRACT

Self-healing coating compositions are provided. In embodiments, such a composition comprises a liquid medium and a network of hollow capsules extending through the liquid medium in three dimensions, the network comprising a plurality of chains formed from the hollow capsules, aggregates of the hollow capsules, or both, wherein exterior surfaces of the hollow capsules of the plurality of chains define a plurality of channels filled with the liquid medium, and wherein the coating composition has a room temperature viscosity greater than that of the liquid medium. Coated surfaces formed from the compositions and methods of protecting surfaces using the compositions are also provided.

15 Claims, 8 Drawing Sheets

(56) References Cited

U.S. PATENT DOCUMENTS

| | | | | |
|---|---|---|---|---|
| 8,575,079 | B2* | 11/2013 | Hwang | C10M 159/12 |
| | | | | 508/120 |
| 8,691,335 | B2 | 4/2014 | Miller | |
| 9,932,484 | B2 | 4/2018 | Aizenberg et al. | |
| 2007/0158609 | A1* | 7/2007 | Hong | C10M 169/04 |
| | | | | 252/71 |
| 2007/0293405 | A1* | 12/2007 | Zhang | C10M 103/02 |
| | | | | 508/113 |
| 2010/0187925 | A1* | 7/2010 | Tingler | B82Y 30/00 |
| | | | | 310/90 |
| 2011/0046027 | A1* | 2/2011 | Zhamu | C10M 103/02 |
| | | | | 977/734 |
| 2015/0118411 | A1 | 4/2015 | Cardenas et al. | |
| 2017/0158886 | A1 | 6/2017 | Odarczenko et al. | |
| 2017/0317336 | A1 | 11/2017 | Zhamu et al. | |
| 2017/0355879 | A1 | 12/2017 | Yan et al. | |
| 2018/0291303 | A1* | 10/2018 | Ventura | C10M 145/40 |

OTHER PUBLICATIONS

Machine translation of DE3150909A1, published Jul. 1983, Powered by EPO and Google. (Year: 1983).*

Alane Tarianna O. Lim et al., "Self-Healing Microcapsule-Thickened Oil Barrier Coatings," *AAAS Research*, vol. 2019, Article ID: 3517816; pp. 1-9. https://doi.org/10.34133/2019/3517816.

Christopher J. Hansen et al., "Self-healing materials with microvascular networks," *Adv. Mater.*, Sep. 2007, vol. 21, pp. 1-5.

Kwonnam Sohn et al., "Oil absorbing graphene capsules by capillary molding," *Chem. Commun.*, 2012, vol. 48; pp. 5968-5970.

S. R. White et al., "Autonomic healing of polymer composites," *Nature*, vol. 409, Feb. 14, 2001; pp. 794-817.

Yu, Zhilong, et al. "Oil-Based Self-Healing Barrier Coatings: To Flow and Not to Flow." *Advanced Functional Materials* (2019); 1906273 (1 of 11).

The International Search Report and the Written Opinion issued on Sep. 16, 2020 for International Patent Application No. PCT/US20/12121; pp. 1-8.

\* cited by examiner

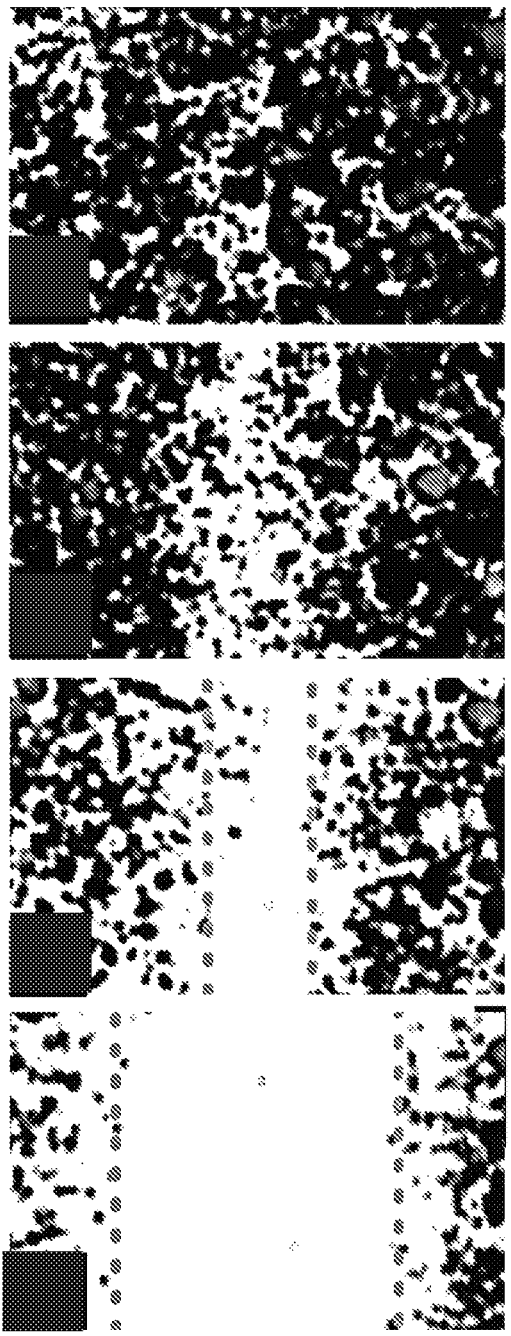

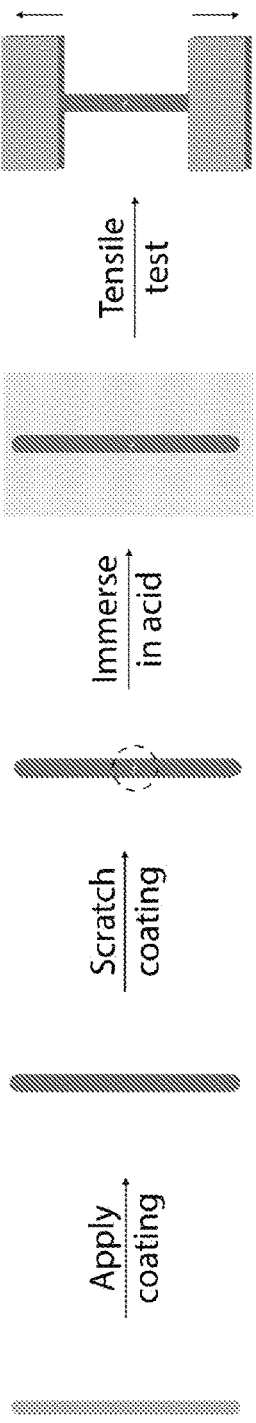
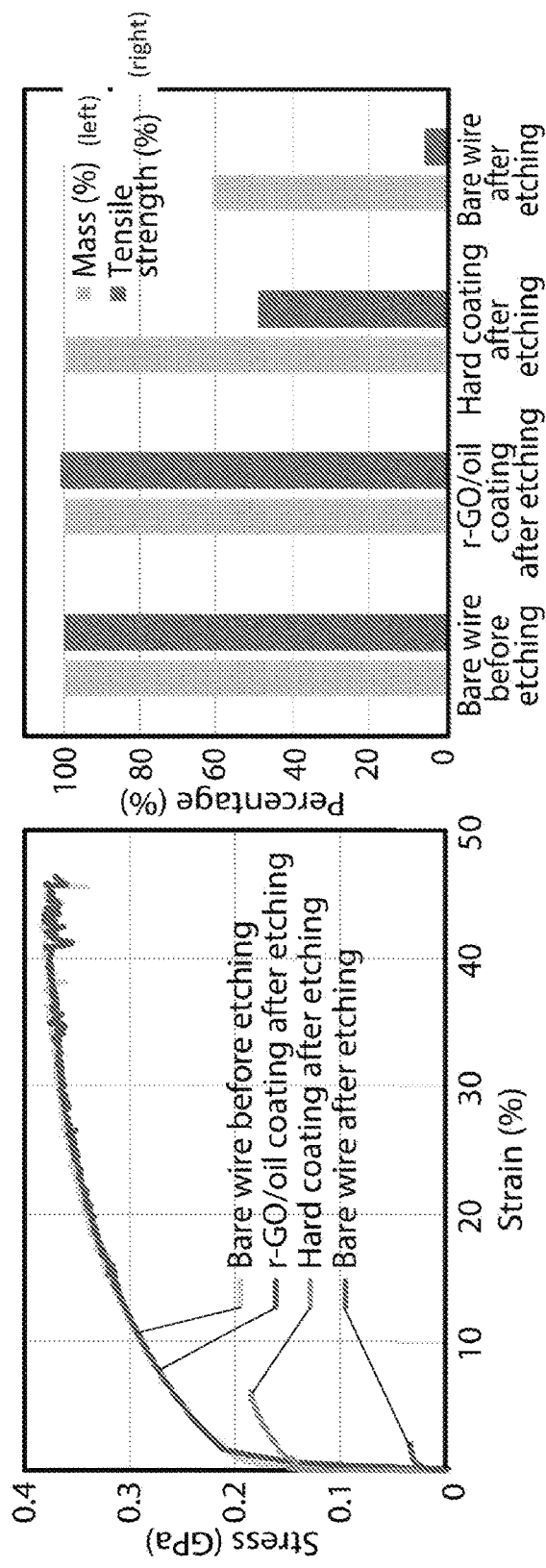
FIG. 5A
FIG. 5B
FIG. 5C

SELF-HEALING COATING COMPOSITIONS

CROSS-REFERENCE TO RELATED APPLICATIONS

The present application is a National Stage of International Application No. PCT/US20/12121, filed Jan. 3, 2020, which claims priority to U.S. provisional patent application No. 62/788,160 that was filed Jan. 4, 2019, the entire contents of both of which are incorporated herein by reference.

REFERENCE TO GOVERNMENT RIGHTS

This invention was made with government support under grant numbers N00014-13-1-0556 and N00014-16-1-2838 awarded by the Office of Naval Research. The government has certain rights in the invention.

BACKGROUND

Barrier coatings can retard corrosion by isolating underlying metal from reactive environments. Pinholes and other minor damages (e.g., cracks and scratches) in the coating only expose small areas of metal. However, reactions at these sites can develop into dangerous localized corrosion, which can lead to catastrophic failure of the overall material system even with very little mass loss. Since these defects are hard to prevent, predict, or detect, responsive coatings that can self-repair are useful for mitigating localized corrosion. There have been a number of strategies for making self-healing coatings that can fix damages autonomously. At the molecular level, systems with reversible bonding can be triggered to reestablish connections, preventing cracks from propagating. Repairing larger cracks requires the delivery of healing agents to damaged areas. For example, microcapsules containing monomers and initiators can be embedded in a polymer coating, which, upon rupture, release the liquids to rapidly fill a crack, polymerize, and solidify.

Since fluid readily flows and reconnects, materials with such liquid-like properties would be ideal for self-healing purposes. However, for the same reason, low-viscosity fluid does not form stable coatings. On the other hand, high-viscosity liquid (e.g., a grease) can form very stable coatings, but it does not flow easily to heal scratched areas. Continuous layers of low-viscosity oils can be stabilized on a surface with patterned pinning sites, which essentially restructures the liquid films into interconnected small reservoirs. These oil films can then act as protective barriers to isolate the substrate from water.

SUMMARY

Provided are self-healing coating compositions and related methods.

Self-healing coating compositions are provided. In embodiments, such a composition comprises a liquid medium and a network of hollow capsules extending through the liquid medium in three dimensions, the network comprising a plurality of chains formed from the hollow capsules, aggregates of the hollow capsules, or both, wherein exterior surfaces of the hollow capsules of the plurality of chains define a plurality of channels filled with the liquid medium, and wherein the coating composition has a room temperature viscosity greater than that of the liquid medium. Coated surfaces formed from the compositions and methods of protecting surfaces using the compositions are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1A shows a scanning electron microscopy (SEM) image and FIG. 1B shows a transmission electron microscopy (TEM) image of the r-GO capsules. FIG. 1C shows the effect of particle (r-GO microcapsules) loading (top line) on the viscosity of a low-viscosity silicone oil (silicone oil only, bottom, dashed line). FIG. 1D shows an optical microscopy image taken near the edge of a thickened oil film on glass slide, confirming the existence of a network structure of the r-GO microcapsules. Thicker parts of the film are hard to image due to overlapping particles. FIG. 1E is a schematic of the network.

FIG. 2A is a schematic drawing illustrating a 3-electrode electrochemical setup to evaluate the r-GO/oil film's anti-corrosion performance in 1 M (3%) HCl. FIG. 2B shows potentiodynamic polarization curves of an uncoated (left line) and coated (right line) μl wires, showing that the r-GO/oil film indeed acts as a barrier and prevents the underlying μl from reacting with HCl.

FIGS. 3A-3E demonstrate the self-healing property of an r-GO/oil coating. FIGS. 3A-3D are optical microscopy images showing that a scratch of about 0.5 mm wide fully heals in seconds. These images reveal that oil rapidly flows to the scratched area, followed by reorganization of particles to reestablish the network. FIG. 3E shows the open-circuit current of an Al wire coated with r-GO/oil immersed in 1 M (3%) HCl during a scratch test. When the coating is scratched, a small area of the metal is exposed. The resulting local corrosion triggers a spike in the current that quickly dissipates within a few seconds, indicating that the coating has self-healed to restore its protective barrier property.

FIGS. 5A-5C demonstrate that the r-GO/oil coating is scratch-tolerant and protects metal wires from localized corrosion. FIG. 5A is a schematic illustration of the experimental procedure testing the effects of localized corrosion on the mechanical properties of brass wires. A wire is first coated with a barrier film, then scratched to expose a small area before being immersed in etching solution (5.5 M or 17% HCl). After etching, tensile tests are performed to directly evaluate corrosion-induced damage. FIG. 5B shows representative stress-strain curves of an unetched wire, etched wire, etched wire with an unhealable coating, and etched wire with the r-GO/oil coating. FIG. 5C is a bar graph summarizing changes in tensile strength and the mass of the wires tested in FIG. 5B. The unprotected wire loses nearly 40% of mass and over 90% of strength after 1 week. The polymer-coated wire has negligible mass loss, even after 2 weeks, but its strength is decreased by about half, due to localized corrosion at the scratch. The wire coated with the self-healing r-GO/oil film retains its original mechanical properties and is not affected by the scratch.

DETAILED DESCRIPTION

Figure 1B:
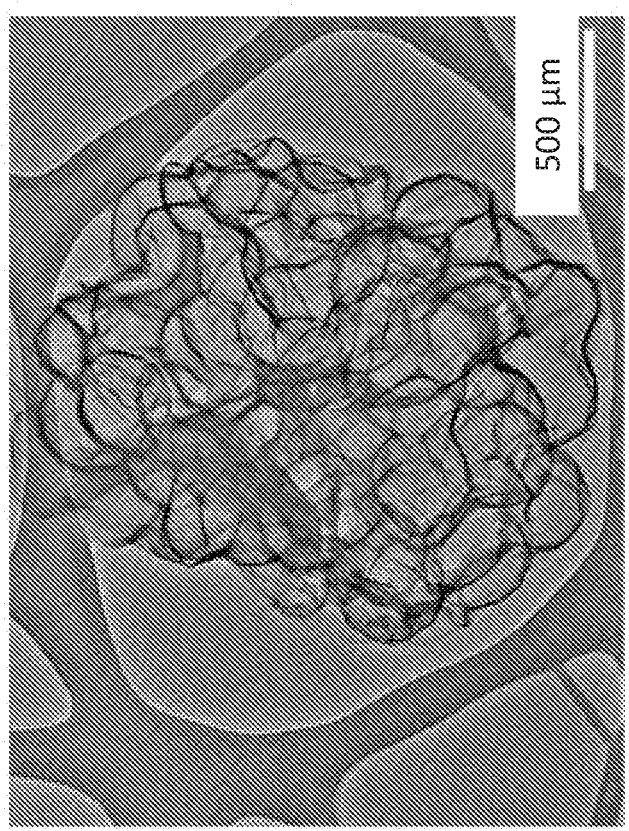
FIGS. 1A-1E demonstrate low-viscosity oil thickened by r-GO microcapsules.

Provided are self-healing coating compositions and related methods. The present approach is based on immobilizing low-viscosity liquids (e.g., oils) by a dynamic network of lightweight colloidal capsules such that a layer of modified liquid forms a stable coating on a variety of surfaces, including metal surfaces. At the macroscopic scale, the liquid coating is thickened and becomes creep-resistant. At the microscopic scale, liquid trapped within the particle (capsule) network is still highly fluidic, and can readily flow and reconnect when the network is broken (e.g., by a scratch), and thus, is self-healing. The coating compositions can be applied on demand on surfaces (even from underwater) to provide anti-corrosion barriers. As least some of the resulting coatings are pinhole-free, stable in high turbulent and highly corrosive environments, and can self-heal up to hundreds of times, facilitating their use in underwater anti-corrosion applications.

In one aspect, self-healing coating compositions are provided. A self-healing coating composition comprises a liquid medium, e.g., an oil, and a network of hollow capsules extending through the liquid medium. The phrase "liquid medium" refers to a material that is a liquid at the temperature at which the composition is being used to form the coating (or the temperature at which the coating is being used as an anti-corrosion barrier). This temperature may be room temperature (20 to 25° C.). The liquid medium has a particular viscosity (e.g., depending upon the type of oil selected) and the hollow capsules are composed of a solid material which assemble together to form a network extending in three-dimensions throughout the liquid medium. This network effectively increases the viscosity of the liquid medium so that the self-healing coating composition forms a stable coating that resists flow when applied to a surface. Pores/channels (defined in the network by exterior surfaces of walls of the hollow capsules) effectively encapsulate regions of the liquid. However, the liquid within those pores/channels remains highly fluid. Thus, macroscopically, the liquid medium of coating composition is viscous and gelled and resists flow. Microscopically viscosity of the liquid medium is essentially unchanged. In addition, the network itself is mobile and dynamic. Individual hollow capsules and aggregates thereof (and thus, the network) can be displaced by a mechanical force (e.g., scratching), resulting in corresponding changes to the physical structure of the network and to the pores/channels defined therein. During this process, some pores/channels may disappear, others may appear, and still others may change shape and/or dimension. At the same time, the liquid within those pores/channels may flow to fill regions previously occupied by hollow capsules. Each of these properties facilitates the "self-healing" nature of the present coating compositions.

As noted above, the liquid medium of the coating compositions is characterized by a room temperature viscosity. Various types of oils may be used for the liquid medium, including combinations of different oils. In embodiments, the oil has a room temperature viscosity of at least 0.02 Pa·s, at least 2 Pa·s, or at least 20 Pa·s. Illustrative oils include vegetable oils, sunscreen oils, mineral oils, silicone oils, and alkanes. In embodiments, other liquid media, e.g., liquid metals, may be used which may not be considered an oil but which have a similar range of room temperature viscosities.

The hollow capsules act as a thickening agent for the liquid medium. The hollow capsules are discrete structures in the form of a shell, the walls of which enclose and define a hollow interior. However, the walls of the hollow capsules do not have to be completely enclosed; at least some of the hollow capsules may have walls which only partially enclose the interior. Exterior surfaces of the walls define the pores/channels described above, which become filled with the liquid medium. Although when formed (see Example, below), the interiors of the hollow capsules are void spaces, when combined with the liquid medium to form the coating compositions, some of the liquid medium may penetrate walls of at least some of the hollow capsules, thereby filling or partially filling the interiors. However, the hollow capsules generally do not contain or encapsulate other materials, by contrast to some existing coating compositions based on catalyst/healing agent-containing microcapsules. The hollow morphology of the capsules (whether empty, filled, or partially filled) contributes to achieving the viscosity increases and self-healing properties for the coating compositions described herein.

The hollow capsules may be characterized by their overall shape and dimensions as well as the thickness of their walls. The hollow capsules may be spherical in shape, but this does not mean perfectly spherical. In addition, the walls need not be perfectly smooth. Hollow capsules may have an average diameter in the range of from 20 nm to 5 µm, from 20 nm to 3 µm, from 20 nm to 1 µm, from 20 nm to 500 nm, from 50 nm to 300 nm, or from 100 nm to 250 nm. Hollow capsules may have an average wall thickness of no more than 25 nm, no more than 15 nm, no more than 10 nm, or in the range of from 1 nm to 15 nm. These nano-to-microscale average diameters and nanoscale average wall thicknesses contribute to achieving the viscosity increases and self-healing properties for the coating compositions described herein. The hollow capsules may assume other, non-spherical shapes. As described in the Example, below, since hollow capsules may be formed via a template material, the shape of the hollow capsules is generally determined by the shape of the template material itself. The average size of non-spherical shapes may be taken as the maximum distance across opposing sides and the average size may be within the ranges of the average diameter described above.

Dimensions may be determined from SEM or TEM images. Average values refer to an average over a representative number of hollow capsules. An aggregate of spherical hollow capsules which have slightly distorted and crumpled walls is shown in FIG. 1B.

The hollow capsules may be characterized by a tap density as determined using the technique described in the Example, below. The tap density may be in the range of from 0.05 g/cm$^3$ to 0.5 g/cm$^3$. This includes a tap density in the range of from 0.1 g/cm$^3$ to 0.4 g/cm$^3$, or from 0.2 g/cm$^3$ to 0.3 g/cm$^3$. These relatively low tap densities contribute to achieving the viscosity increases and self-healing properties for the coating compositions described herein.

Figure 1A:
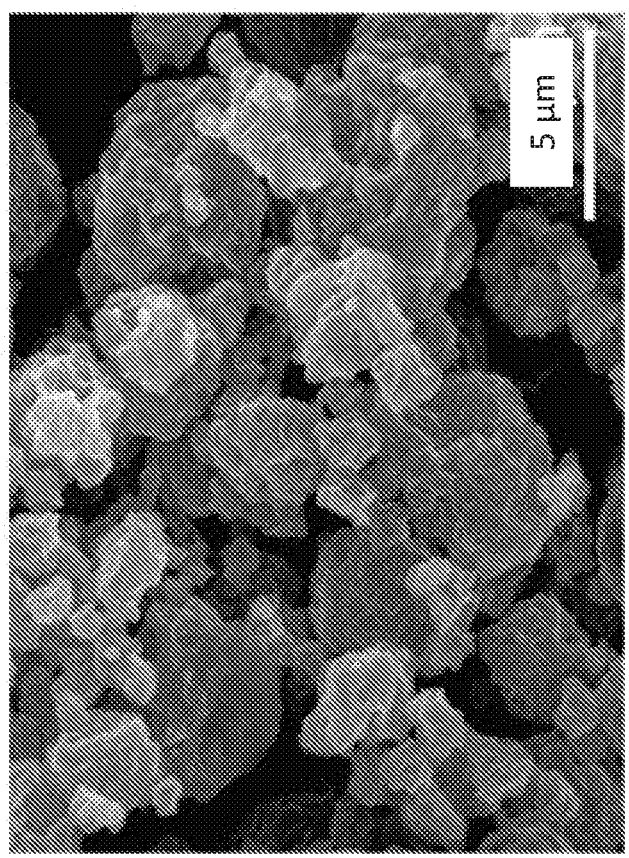
Figures 1C, 1D, 1E:
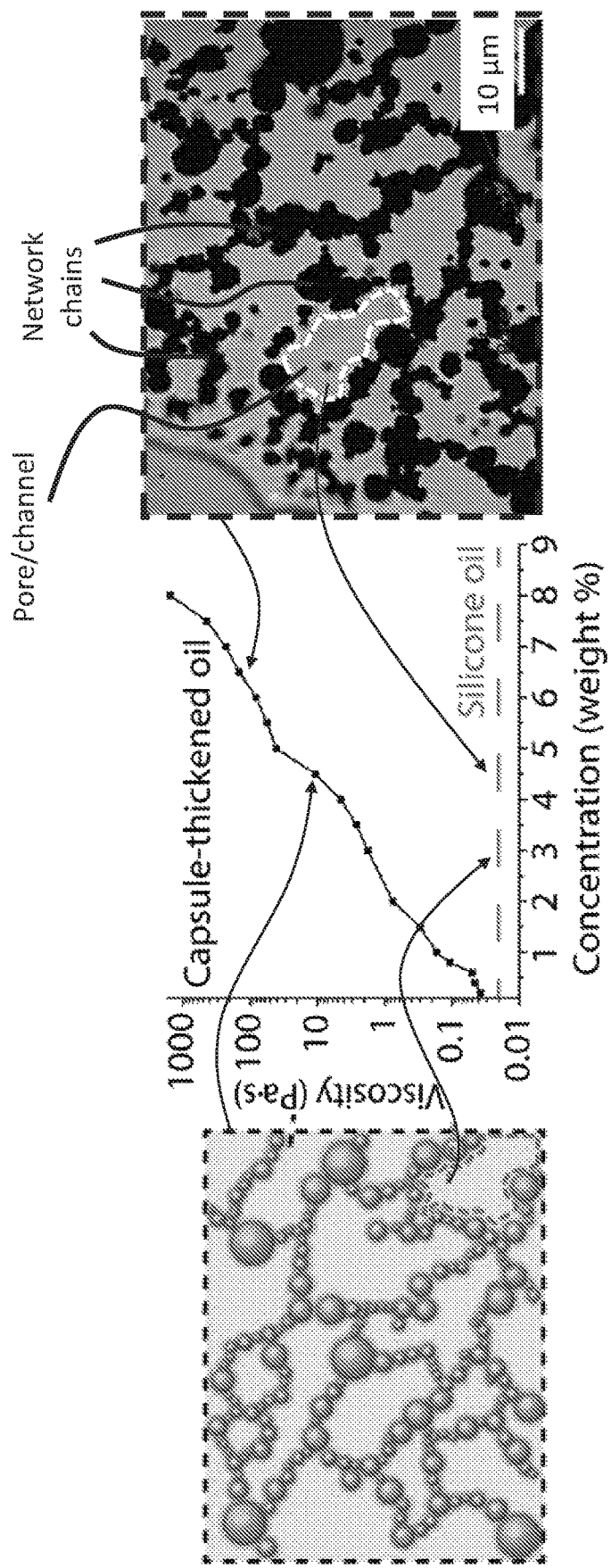

As shown in FIG. 1D, individual hollow capsules assemble together in the liquid medium, e.g., oil, to form chains of hollow capsules, aggregates of hollow capsules, chains of aggregates, and combinations thereof. This provides an interconnected network of hollow capsules extending throughout the liquid medium in three dimensions. The assembly of hollow capsules, and thus the network, is random in nature, by contrast to some existing coating compositions based on lithographically defined/printed vascular networks. A pore defined by the network is labeled. These pores are highly irregular in shape and are not necessarily completely enclosed. As such, they may be characterized as a collection of tortuous, interconnected channels extending through the coating composition, the channels filled with the liquid medium of the coating composition. A schematic of the network of the coating compositions is shown in FIG. 1E. FIG. 1C demonstrates the surprising and remarkable ability of the network (in this embodiment, a network of hollow graphene capsules) to increase the viscosity of a liquid (in this embodiment, silicone oil). At the microscopic level, however, within a pore/channel of the network, the liquid remains highly fluid.

The loading of the hollow capsules in the liquid medium is selected to ensure formation of the network as well as to achieve the self-healing properties described above (insufficient loading inhibits network formation while overloading inhibits the mobility of the network and thus, reorganization of the network). The loading may be selected to achieve a desired viscosity (or an increase in viscosity as compared to the viscosity of the liquid medium itself). The hollow capsules are capable of greatly increasing the viscosity of the liquid medium even at very low loadings. Loadings may be referred to as weight percentages, i.e., ((weight of hollow capsules/total weight of coating composition)*100). In embodiments, the loading is that which increases the viscosity of the liquid medium by a factor of at least 10, at least 100, at least 250, at least 500, at least 750, at least 1000, or at least 2000. In embodiments, the increase in viscosity at a 5 wt % loading of hollow capsules is a factor of at least 10, at least 100, at least 250, at least 500, at least 750, at least 1000, or at least 2000. Viscosities may be determined as described in the Example, below. In embodiments, the loading is that which provides the coating composition with a room temperature viscosity of at least 40 Pa·s, at least 60 Pa·s, at least 80 Pa·s, at least 100 Pa·s, or in the range of from 40 Pa·s to 100 Pa·s.

The hollow spheres may be composed of various materials, although the materials are generally wettable by the selected liquid medium, e.g., lipophilic for liquid media composed of oil/alkanes. The term "wettable" may be quantified by contact angle measurements, which may be carried out using standard techniques. Wettable materials are those for which a droplet of the liquid medium on the wettable material exhibits a contact angle of between 0° and 100°. In embodiments, the hollow spheres are composed of graphene. Methods for making graphene hollow spheres are described in the Example, below. In this Example, graphene hollow spheres are fabricated by spray-drying a mixture of 2 mg/mL graphene oxide with polystyrene stock solutions in a 10:1 ratio, then reducing the collected graphene oxide capsules under argon at 600° C. for 4 hours to make hollow graphene spheres. Other suitable materials include lipophilic polymers and silica (see Example, below), provided the materials are capable of achieving the hollow morphology, dimensions, and tap densities described above. Cellulose and wood fibers may be used to make the hollow spheres.

The coating composition may further comprise one or more additives at various amounts, which may be useful for further tuning the properties of the coating composition.

The coating compositions may be used to form coatings on surfaces in order to protect those surfaces from external forces, e.g., mechanical forces and/or chemical forces (e.g., corrosion), which can undesirably alter the physical and mechanical properties of the unprotected surfaces. Thus, in another aspect, coatings formed from the any of the disclosed coating compositions and coated surfaces are provided. Various surfaces may be protected by the coating compositions, including metal surfaces. Illustrative metals include Cu, Fe, Al, and alloys thereof, e.g., steel and brass. The coating compositions may be applied using various techniques (e.g., brushing, spraying, dipping, etc.) so as to form a layer of the coating composition on the surface. The thickness of the layer/coating generally depends upon the application technique and the viscosity of the coating composition. As described in the Example, below, application of the coating composition may be carried out even when the desired surface is submerged in a liquid, e.g., water. In addition, the surface can be, but need not be, planar. Non-planar surfaces may also be coated and the resulting coatings may still exhibit any of the properties described below.

The coatings formed on surfaces using the coating compositions may be characterized by one or more of the following properties: stability, corrosion resistance, and self-healing. Tests for measuring these properties under certain conditions are described in the Example, below. Regarding stability, the coatings may exhibit high stability over extended periods of time in a variety of conditions. By way of illustration, in embodiments, an area of the coating composition deposited on a surface retains the same shape and dimensions after a period of at least 4 weeks, at least 5 weeks, or at least 6 weeks under exposure to air. In embodiments, an area of the coating composition deposited on a surface retains the same shape and dimensions after a period of at least 30 min, at least 45 min, or at least 60 min under water. In embodiments, an area of the coating composition deposited on a surface retains the same shape and dimensions after a period of at least 2 days, at least 3 days, or at least 5 days while being exposed to turbulent water having a linear velocity in the range of from 0.5 to 1 m/s. Coatings which exhibit these properties are described in the Example, below.

Figure 2A:
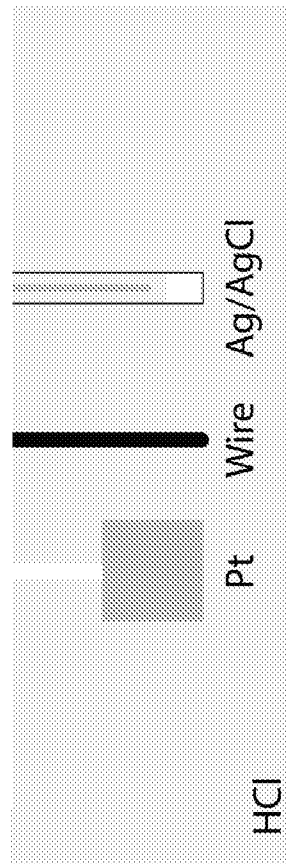
FIGS. 2A-2B demonstrate that an r-GO/oil barrier coating protects metal against corrosion.
Figure 2B:
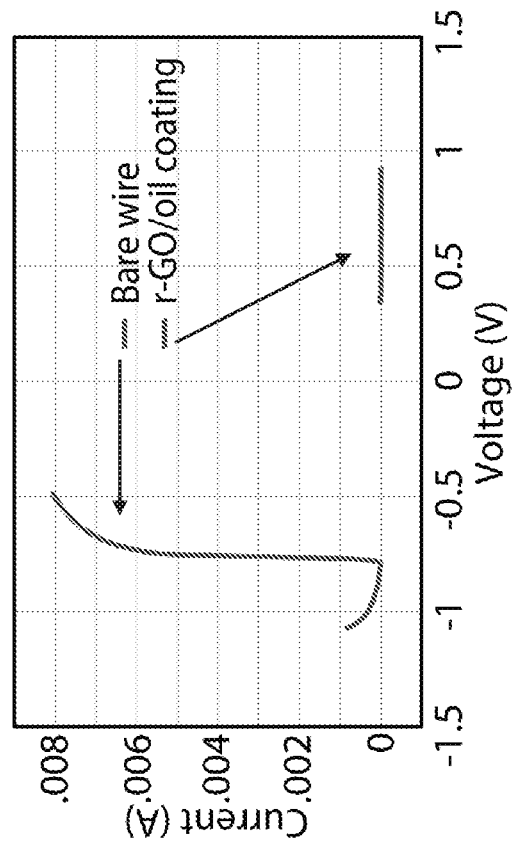

Regarding anti-corrosion, the coatings may exhibit an ability to resist corrosion over extended periods of time in a variety of conditions. By way of illustration, in embodiments, a wire coated with the coating composition exhibits a flat potentiodynamic polarization curve at 0 A (see FIG. 2B). In embodiments, a wire coated with the coating composition remains intact after a period of at least 2 months, at least 3 months, at least 7 months, or at least 12 months while being immersed in a 20% HCl solution. Coatings which exhibit these properties are described in the Example, below.

Figure 3E:
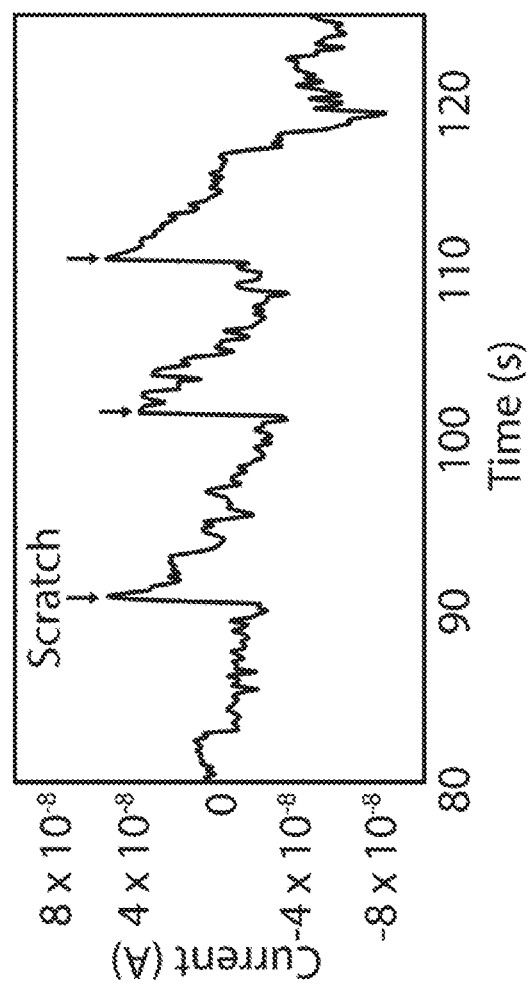

Regarding self-healing, the coatings may exhibit an ability to self-heal, i.e., reform as described above, after exposure (including after repeated exposure) to an external force. In embodiments, a scratch in a coated surface disappears in a short period of time (e.g., seconds, minutes) under air (FIGS. 3A-3D) or water or acid. Reformation may also be evaluated via open-circuit measurements as shown in FIG. 3E. In embodiments, a coated surface exhibits an ability to self-heal after being scratched at least 100 times, at least 150 times, or at least 200 times under water. In embodiments, a wire coated with the coating composition exhibits no change in tensile strength after the coating is scratched and immersed in 5.5 M HCl for 2 weeks (see FIG. 5B-5C). Coatings which exhibit these properties are described in the Example, below.

In yet another aspect, methods of protecting a surface are provided. Such a method comprises applying any of the disclosed coating compositions to a surface to form a coating thereon. The method may further comprise applying an external force to the coating to create a defect therein, wherein the coating self-heals after a period of time. The self-healing effectively eliminates the defect to restore the coating to its original form and having its original properties. As described above, the external force is not particularly limited, nor is the type of defect. The self-healing effectively eliminates the defect to restore the coating to its original form and having its original properties. The self-healing may be confirmed using any of the techniques described herein (optical images, SEM images, open-circuit measurements, tensile strength measurements, etc.) to achieve any of the self-healing properties described herein. Application of the external force and subsequent self-healing may be repeated multiple times.

EXAMPLE

Materials and Methods

Materials. Graphene oxide (GO) sheets were synthesized through a modified Hummer's method as reported elsewhere. (W. S. Hummers et al., *J. Am. Chem. Soc.* 80, 1339-1339 (1958); and F. Kim et al., *Adv. Funct. Mater.* 20, 2867-2873 (2010).) Polystyrene colloids were prepared through emulsion polymerization. (D. Zou et al., *J. Polym. Sci., Part A: Polym. Chem.* 28, 1909-1921 (1990).) Reduced graphene oxide (r-GO) capsules were made by an aerosol-assisted synthesis method based on a previous report, using a spray dryer (Buchi Nano Spray Dryer B-90). (K. Sohn et al., *Chem. Commun.* 48, 5968-5970 (2012).) A mixture of 1 L 2 mg/mL GO sheets and 100 mL polystyrene colloids (200 nm diameter) was sprayed at 80° C., which yielded GO-wrapped polystyrene beads. r-GO capsules were obtained by heating the product under argon at 600° C. for 4 hours, which reduced GO and removed the sacrificial polymer template. The apparent density of the capsules was determined to be 0.12 g/cm$^3$ by measuring the volume of a known mass of powder within the end of a cylindrical pipette tip. SEM images of the r-GO capsules were taken with a FEI Nova 600 SEM. TEM images were taken with a JEOL ARM300F GrandARM transmission electron microscope. These particles were added to oil at various weight fractions to adjust viscosity. Various types of oils such as household vegetable oils, household sunscreen oils, light mineral oils, and silicone oils were tested, all of which worked for self-healing coatings. Silicone oil was chosen as the model system due to its high stability against degradation and low solubility in water. Low-molecular-weight (viscosity 20 cSt, i.e., around 0.02 Pa·s) and high-molecular-weight (viscosity 100,000 cSt, i.e., around 100 Pa·s) silicone oils were purchased from Sigma-Aldrich. A number of metal wires were tested, including brass, copper, steel, and aluminum. The wires were briefly polished with sandpaper and washed with ethanol to remove any existing surface coating. Hollow spheres of poly(o-methoxy)aniline (average diameter: 2.27 µm, average wall thickness: 191 nm) and silica (average diameter: 3.94 µm, average wall thickness: 223 nm) were synthesized using methods in the literature. (P. J. Bruinsma, et al., *Chem. Mater.* 9, 2507-2512 (1997); and L. Zhang et al., *J. Phys. Chem. C* 113, 9128-9134 (2009).)

Viscosity measurement. Viscosities of the r-GO/oil coatings were measured on an Anton Paar Physica MCR 300 rheometer with a cone-and-plate (lower loading levels) or parallel plate geometry (higher loading levels). Typically, 0.5 g of particle/oil coating was subjected to shear rates from 0.1 to 100 rad/s to measure the resulting shear stresses. The viscosity at 0.1 rad/s was chosen for comparison.

Stability under shearing water. Copper wires (1.02 mm diameter) coated with r-GO/oil films were immersed in a water bath, which was stirred at a nominal speed of 600 and 1200 rpm for 1-2 weeks. The linear shear velocity of water was estimated to be 0.5 to 1 m/s using a dye tracking method, in which a droplet of concentrated dye solution was dispensed into the whirlpool and tracked using a camera in slow motion mode (240 fps). The initial linear velocity of this droplet (e.g., within the first 100 ms, before it became too diffuse) was calculated to represent the linear flow rate of the whirlpool.

Electrochemical tests. The anti-corrosion performance of r-GO/oil on aluminum in a 1 M (3%) HCl solution was evaluated using an Autolab electrochemical interface instrument (PGSTAT 302N). The electrochemical cell (illustrated in FIG. 2A) was a three-electrode setup consisting of platinum (counter electrode), a freshly polished aluminum wire that was either bare or coated with r-GO/oil (working electrode), and Ag/AgCl (reference electrode). The polarization curves (FIG. 2B) were measured from $-0.3$ $V_{OCP}$ to $0.3$ $V_{OCP}$ at a scan rate of 0.001 V/s and a step size of 0.01 V. To investigate the electrochemical behavior of self-healed scratches (FIG. 3E), open-circuit current of an r-GO/oil-coated Al wire immersed in the same electrochemical cell was monitored at time increments of 0.2 s. The wire was scratched with a plastic pipette tip to induce local corrosion.

Anti-corrosion tests. An uncoated Al wire (1.02 mm diameter) and another coated with r-GO/oil film were immersed into 5.5 M (17%) HCl. Al boats shown were made from foil by folding and were floated on a solution of 2 M HCl in a 100 mm diameter petri dish. 0.2 mL of 0.1 wt. % methylene blue solution was loaded in the boats as color indicator of leakage.

Visual and optical microscopy observation of self-healing property (FIGS. 3A-3E) r-GO/oil coating was applied onto a glass slide and swiped with a 200 µL pipette tip to generate scratches that were about 0.5 to 1 mm wide. Optical microscopy images (Nikon Eclipse TE2000-U) were recorded using a monochrome interline CCD camera (Photometrics, CoolSNAP HQ2).

Figure 4:
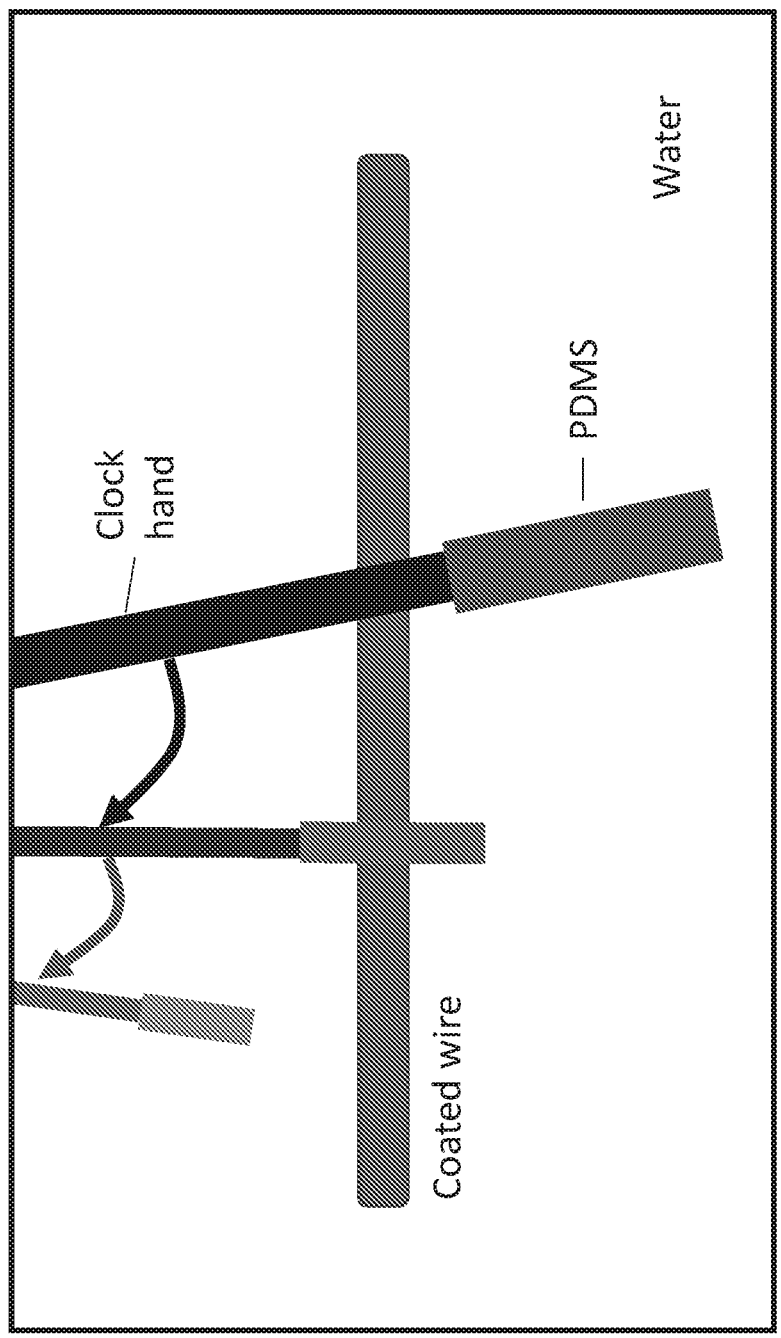
FIG. 4 demonstrates the exhaustive scratching and healing test performed. A PDMS rod with a diameter of around 1 mm was attached to a clock hand to repeatedly scratch an r-GO/oil coated wire, at the same spot, once every minute. Every scratch removes a small piece of the coating, which repeatedly heals until there is an insufficient amount of r-GO/oil left to form a complete coverage on the wire. For the wire (1.02 mm in diameter) shown here, the coating sustained 180 scratches. Unhealable damage on the coating becomes visible after 240 scratches.

Exhaustive self-healing test. As shown in FIG. 4, a metal wire coated with r-GO/oil was fastened horizontally under water. A polydimethylsiloxane (PDMS) rod with diameter around 1 mm was used to scratch the coating repeatedly at the same spot. The PDMS rod was attached to the "second" hand of a ticking clock, so that it scratched the coated wire once per minute.

Evaluating corrosion-induced degradation of mechanical properties. Brass wires were first coated with r-GO/oil or Rust-Oleum 2× (a polymer-based anti-corrosion paint) and then scratched with a razor blade to generate small slits that were around 0.3 mm wide. Wires with scratched coatings were immersed into 5.5 M (17%) HCl (1 week for uncoated wires, 2 weeks for coated wires). Stress-strain curves were obtained using a Bose ElectroForce 5500 tensile tester. SEM images of the wire surfaces after corrosion were taken with a FEI Nova 600 SEM. In control experiments, wires coated with the paint, but unscratched, were also immersed in HCl to show the effect of pinholes, which are hard to prevent and detect during the coating process.

Several Movies were Obtained (not Shown), Including the Following:

Movie S1. Brushability of r-GO/oil coating underwater. The movie showed that an r-GO/oil film was readily applied to an aluminum wire underwater with a paintbrush. After the wire was completely coated, another aluminum wire was fastened next to the coated wire and HCl was added. The uncoated wire reacted with the added HCl, as shown by the formation of bubbles on the wire surface, while the coated wire remained protected.

Movie S2. Macroscopic visualization of self-healing r-GO/oil coating. The movie showed that an r-GO/oil film on a glass microscope slide was scratched with a pipette tip and observed to heal within seconds. This healing process can be readily seen by eye.

Movie S3. Microscopic visualization of self-healing r-GO/oil coating. The movie showed that a scratch broke the particle network within the coating. As the freed low-viscosity oil flowed into the scratch, it carried lightweight microcapsules towards the scratch, which reorganized to reestablish the network.

Movie S4. Repeatability of self-healing. The movie showed that a strip of PDMS attached to the "second" hand on a clock scratched a self-healing coating at one spot. The clock can be left running to test the number of times the coating can be scratched at the same location.

Results and Discussion

Microcapsule-thickened oil. Hollow microcapsules of reduced graphene oxide (r-GO) with an apparent density of around 0.12 g/cm$^3$ (FIGS. 1A and 1B) were used in the studies below. The microcapsules were made by spray-drying a mixture of graphene oxide sheets and polystyrene colloids of around 200 nm in diameter, followed by thermal annealing to reduce graphene oxide and remove the polystyrene beads (see Materials and Methods). The resulting microcapsules were made of interconnected voids of around 200-250 nm in diameter with thin graphene walls of less than 10 nm. They were sufficiently robust and resilient during handling. As shown in FIG. 1C, r-GO microcapsules can increase the viscosity of silicone oil by 1000 times at just about 5 wt. % loading. Optical microscopy observation confirmed that the r-GO microcapsules indeed form an extended network in the oil (FIG. 1D). A schematic of the extended network is shown in FIG. 1E. Heavier hollow microcapsules made of poly(o-methoxyaniline) or silica were also used in other experiments, but much higher loading levels (e.g., 15-35 wt. %) were required for the resulting coatings to achieve similar increases in viscosity. The drastic thickening effect of r-GO microcapsules is primarily attributed to their light weight. r-GO microcapsules also have a few other desirable properties. Similarly, prepared r-GO capsules absorb oil well, allowing them to stay wetted by and immersed in the oil rather than floating on the surface. The black color of r-GO also facilitates direct visual inspection and optical microscopy observation of the oil coating.

Stability of r-GO/oil coating on metal surfaces. Data show that coatings made from the r-GO thickened oil are remarkably stable in air and under water. For example, a drop of low-molecular-weight silicone oil with viscosity of around 0.02 Pa·s readily flows down a slope of Al foil in about 10 s, while the same oil loaded with r-GO capsules (around 5 wt. %, hereafter denoted as r-GO/oil) sticks to the foil firmly. The thickened oil has a viscosity of around 40 Pa·s. In a control experiment, high-molecular-weight silicone oil with even higher viscosity (around 100 Pa·s) was tested, which can also form a stable coating on Al foil. However, when immersed under water, the high-viscosity oil film gradually dewetted within 60 minutes due to the preferential wetting of the Al surface by water and the oil's lower density than water. In contrast, the r-GO/oil coating remained stable. The r-GO/oil coating is capable of resisting lateral compressive stresses induced by the surface tension of water and hinders the shrinkage of the oil film, which may be attributed to the jamming of the particles. The r-GO/oil coating can withstand highly turbulent water. A coated copper wire (1.02 mm in diameter) was immersed in a whirlpool generated by magnetic stirring, from 600 rpm to the maximum stirring speed of 1200 rpm. The coating remained intact after days of vigorous stirring. Under these stirring conditions, the linear velocities of water around the wire were estimated to be in the range of 0.5 to 1 m/s using a dye-tracking method (see Materials and Methods), which are on par with the typical flow rates of rivers.

Barrier performance of r-GO/oil coating. The r-GO/oil coating can indeed act as a barrier to protect metal against corrosion over extended periods of time. A 3-electrode electrochemical cell (FIG. 2A) consisting of platinum as the counter electrode, an Al wire as the working electrode, and Ag/AgCl as the reference electrode was used to evaluate the barrier performance of the r-GO/oil film in a solution of 1 M (3%) HCl. The potentiodynamic polarization curve of a bare Al wire (FIG. 2B, line on left) shows anodic and cathodic branches typically associated with the corrosion of a metal in a solution. In contrast, the same experiment performed on a r-GO/oil coated Al wire (FIG. 2B, line on right) resulted in a nearly flat line around zero current, indicating that the r-GO/oil coating insulates the underlying Al from reacting with the electrolyte solution, and thus prevents metal corrosion. Other tests show the long-term anti-corrosion performance of r-GO/oil coating. An Al wire (1.02 mm diameter) immediately started to react upon dipping in 20% HCl solution, generating $H_2$ bubbles on its surface. After one hour, the immersed part of the wire was almost entirely etched. However, an r-GO/oil-coated wire stayed intact after being immersed in this highly corrosive solution for at least 3 months. Some coated wires were found to be intact after being immersed for over a year.

The r-GO/oil film adheres well to many types of metal surfaces (e.g., Cu, Fe, Al and their alloys), even those with complex geometries or sharp corners, on which oil film tends to dewet. An example is demonstrated in tests in which an Al foil boat was placed on a sea of 2M HCl. The boats were loaded with a methylene blue dye solution to indicate leakage. Without a barrier coating, the Al boat was rapidly etched by HCl. It started to leak after 8 minutes and completely dissolved in 20 minutes. In contrast, the boat coated with an r-GO/oil film was well protected for over a day and remained intact after the dye solution or even the entire HCl bath dried out. The r-GO/oil coating can be conveniently applied to metal surfaces on demand, even from underwater, simply with a brush to yield a pinhole-free barrier coating (Movie S1) capable of stopping ongoing corrosion. As a control, a bare Al wire was also immersed, which immediately started to bubble due to reaction with HCl.

Self-healing property of r-GO/oil coating. While the r-GO/oil coating exhibits remarkable stability, it does not lose the self-healing properties of the oil. The coating is capable of healing sub-millimeter to millimeter scale scratches in seconds (see Movie S2). Optical microscopy observation (FIGS. 3A-3D, also see Movie S3) reveals that when a scratch breaks part of the particle network, nearby oil immediately starts flowing to the exposed area and brings new particles to reestablish the network. The flow of particles stops after the coating is healed (FIG. 3D). Other tests involved coatings that were applied to aluminum wires. They demonstrate that the coating can quickly self-heal in both water and in 5% and 10% HCl when scratched. Eventually, when immersed in 20% HCl solution, the evolution of $H_2$ bubbles at the scratched area is too fast to allow the r-GO/oil coating to recover. This self-healing behavior can also be seen in open-circuit current measurement (FIG. 3E) of an Al wire coated with r-GO/oil immersed in 1 M (3%) HCl. When the coating is scratched, a small area of the metal is exposed, triggering a current spike that gradually decays to near zero within a few seconds, indicating that the coating has self-healed. The coating can self-heal multiple times in succession. The duration of the current spikes matches the time scale of the self-healing behaviors observed as described above.

Although only 3 consecutive scratching-healing cycles were shown in the electrochemical test shown in FIG. 3E, r-GO/oil coating is actually quite tolerant to scratches and can self-heal up to hundreds of times at the same spot. The drawing in FIG. 4 illustrates an exhaustive scratch test on a r-GO/oil coated wire immersed under water. A soft rod made of polydimethylsiloxane (PDMS) was attached to the minute hand of a clock, so that it could repeatedly scratch the immersed wire at the same location once every minute. As long as there was a sufficient reserve of oil to flow to the scratched area and extra capsules above the percolation threshold to reconnect the broken network, the r-GO/oil coating sustained scratching and self-healed repeatedly (see Movie S4). Therefore, although a small piece of the coating is removed during each scratch, the coating shown in FIG. 4 repeatedly heals even after 180 scratches. After 240 scratches, the damage on the coating becomes visible, when the remaining amount of r-GO/oil becomes insufficient to completely cover the wire.

Figure 6:
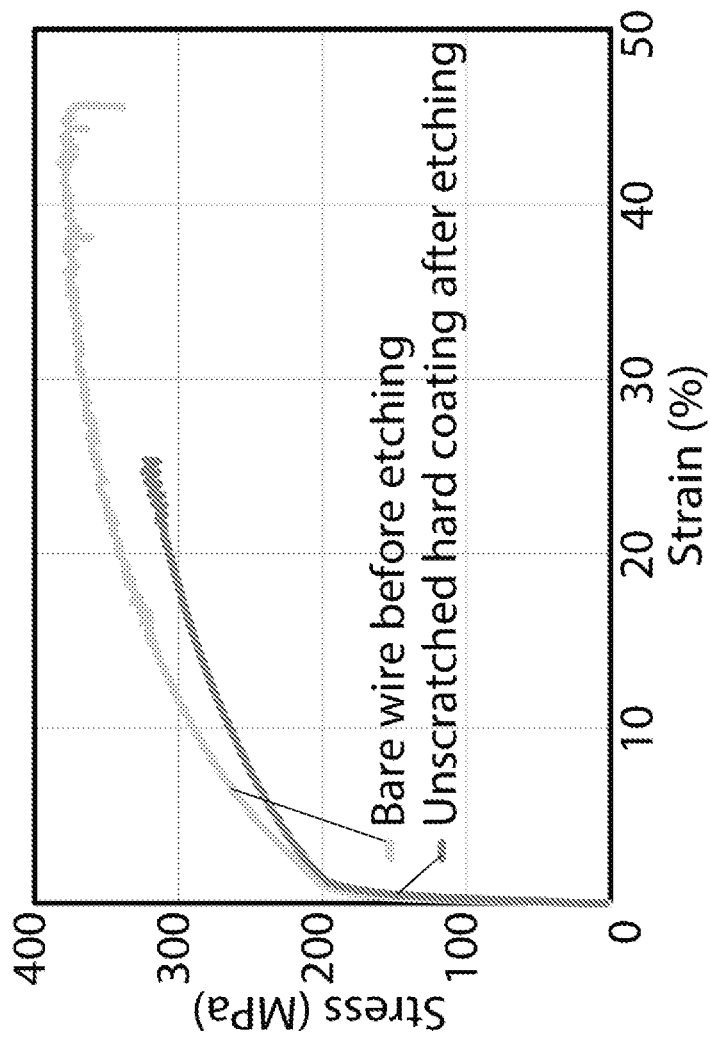
FIG. 6 demonstrates that localized corrosion through pinholes can drastically degrade the properties of metal wires. Shown is the stress-strain curve of a brass wire protected with an unscratched polymer coating after being immersed in 5.5 M (17%) HCl for 14 days, compared to that of a pristine wire. The etched wire experiences no detectable mass loss, but obvious reduction in strength and ductility.

Mitigation of localized corrosion with self-healing coating. The scratch-tolerant, self-healing properties of r-GO/oil coatings make them an effective type of barrier for mitigating localized corrosion. A proof-of-concept experiment is shown in FIG. 5A, in which brass wires were first protected with a barrier coating, then scratched to expose a small area to simulate localized corrosion, then immersed in highly corrosive solutions (5.5 M HCl) for 2 weeks. A hard polymer coating was tested as a control to illustrate the importance of the self-healing capability of the barrier coating. Typical corrosion tests often measure the mass loss of metals. Such measurements do not reflect the drastic degradation of mechanical properties by localized corrosion, which can occur with negligible mass loss. Therefore, tensile tests were performed to directly evaluate the damage in mechanical properties as a result of localized corrosion on the wires. FIG. 5B shows representative stress-strain curves of a number of brass wire samples before and after etching. FIG. 5C compares the percentages of tensile strength and mass of these wires after etching, relative to those of the unetched wire. Without a protective barrier, the wire lost nearly 40% of its mass and over 90% of its strength after just 1 week. The wire coated with a hard polymer barrier experienced negligible mass loss after 2 weeks, but its strength decreased by about 50% due to localized corrosion at the scratched area. This is confirmed in SEM images (not shown). The SEM images show that the surface of a new wire was relatively smooth before etching. After etching in 5.5 M (17%) HCl for 7 days, the surface was highly corroded and roughened. A wire protected by the r-GO/oil coating showed no signs of corrosion even after 14 days of etching. Significant, localized corrosion occurred at the scratched area of the brass wire protected by the polymer coating. In fact, even without the intentionally made scratch, the polymer-coated wires still suffered significant property degradation from corrosion due to pinholes, which are hard to prevent and detect (see FIG. 6). SEM examination of the etched wire reveals microcracks on the wire, likely due to localized corrosion through some hard-to-detect pinholes on the coating. In contrast, with the r-GO/oil's rapid self-healing capability, the wire coated with r-GO/oil retained its original mechanical properties even after being immersed in the etchant solution for 2 weeks.

Conclusion

In conclusion, by using lightweight microcapsules as thickening agents, even low-viscosity oil can form continuous, highly stable, protective barrier coatings on metal surfaces. Such oil coatings are intrinsically pinhole-free, and they can quickly self-heal many times when they are scratched, making them useful as an on-demand or urgent solution for protective barrier applications. Although most of the work presented here is demonstrated with r-GO microcapsules, the described strategy is largely materials agnostic, and is applicable to a wide range of lightweight particles. The particles can also be loaded with other materials to render additional functions to enhance the barrier coatings.

Additional Experiments

Additional experiments were performed to demonstrate other capsule/oil coating compositions were able to achieve similar creep-resistance and self-healing properties as compared to the r-GO/silicone oil coating composition. First, coating compositions of octyldodecanol and polymer microspheres (Expancel 461 DE 20 d70) were prepared. The polymer microspheres had a tap density of about 0.06 g/cm$^3$ and a diameter of about 15 to 25 μm. The compositions included up to about 5 wt % of the polymer microspheres. The compositions were used to form coatings on an aluminum surface. The coatings did not drip when tilted and spontaneously healed in seconds after being scratched. Optical microscopy observation showed that once an area of the coating was damaged by a scratch, the oil flows into the exposed area and heals the scratch, bringing particles from the neighboring area to re-establish the thickening network in the damaged area. Second, coating compositions of silica particles (VM-2270, Dow Corning, 5-15 microns particle size) and 2-ethylhexyl trans-4-methoxycinnamate (a commonly used sunscreen oil) were prepared. The compositions included from about 3 to about 10 wt % of the silica particles. The compositions were used to form coatings on an aluminum surface and similar results were obtained. An advantage of the silica and polymeric capsules is their potential to be transparent or white in color. Such a coating may be colored by combining with the appropriately colored oil or an additional dye.

Another set of experiments demonstrated the anti-biofouling properties of the coating compositions. An aluminum foil-wrapped glass slide was immersed in a bath of *C. vulgaris* (i.e., green algae), which was cultured following 16 hours of light/8 hours of darkness in an algae-growing medium (Alga-Gro fresh water in Carolina). The same was done for another slide coated with a r-GO/silicone oil coating composition. After one week, the samples were removed from the bath and gently rinsed under running water. Extensive growth of algae on the bare aluminum foil was observed, which formed a uniform green biofilm covering the entire surface. This biofilm adheres strongly and cannot be removed by rinsing. In contrast, there was much less algae deposition on the r-GO/oil coated aluminum foil. Moreover, the deposited algae could be readily rinsed off.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the invention to enable one skilled in the art to utilize the disclosure in various embodiments and with various modifications as suited to the particular use contemplated. It is intended that the scope of the disclosure be defined by the claims appended hereto and their equivalents.

What is claimed is:

1. A self-healing coating composition comprising a liquid medium and a network of hollow capsules extending through the liquid medium in three dimensions, the network comprising a plurality of chains formed from the hollow capsules, aggregates of the hollow capsules, or both, wherein exterior surfaces of the hollow capsules of the plurality of chains define a plurality of channels filled with the liquid medium, and wherein the coating composition has a room temperature viscosity greater than that of the liquid medium, further wherein the hollow capsules are composed of graphene and the hollow capsules are present in the coating composition at a loading in a range of from 5 weight % to 8 weight % and wherein the liquid medium is silicone oil.

2. The self-healing coating composition of claim 1, wherein the room temperature viscosity of the liquid medium is in a range of from 0.02 Pa·s to 20 Pa·s.

3. The self-healing coating composition of claim 1, wherein the hollow capsules have an average diameter in a range of 20 nm to 5 µm and an average wall thickness of no more than 25 nm.

4. The self-healing coating composition of claim 1, wherein the hollow capsules have a tap density in a range of 0.05 g/cm3 to 0.5 g/cm$^3$.

5. The self-healing coating composition of claim 1, wherein the room temperature viscosity of the coating composition is greater than that of the liquid medium by a factor of at least 500.

6. The self-healing coating composition of claim 1, wherein a droplet of the liquid medium on the material from which the hollow capsules are composed exhibits a contact angle in a range of from 0° to 100°.

7. The self-healing coating composition of claim 1, wherein the graphene is reduced graphene oxide.

8. The self-healing coating composition of claim 1, wherein the coating composition consists of the liquid medium and the hollow capsules.

9. A coated surface comprising a substrate and a coating of the self-healing coating composition of claim 1 on a surface of the substrate.

10. The coated surface of claim 9, wherein the substrate is a metal.

11. The coated surface of claim 10, wherein the metal is Cu, Fe, Al, alloys thereof, steel, or brass.

12. The coated surface of claim 9, wherein the room temperature viscosity of the liquid medium is in a range of from 0.02 Pa·s to 20 Pa·s.

13. The coated surface of claim 9, wherein the hollow capsules have an average diameter in a range of 20 nm to 5 µm and an average wall thickness of no more than 25 nm.

14. The coated surface of claim 9, wherein the hollow capsules have a tap density in a range of 0.05 g/cm$^3$ to 0.5 g/cm$^3$.

15. A method of protecting a surface of a substrate, the method comprising applying the self-healing coating composition of claim 1 on a surface of a substrate, thereby forming a coating thereof.

* * * * *